US006987336B2

(12) United States Patent
Streng et al.

(10) Patent No.: US 6,987,336 B2
(45) Date of Patent: Jan. 17, 2006

(54) ELECTRIC MOTOR WITH SCREWLESS PLUG-TYPE MOUNTING

(75) Inventors: Gunter Streng, Schrozberg (DE); Rainer Müller, Zweiflingen-Pfahlbach (DE); Markus Gelbing, Wallhausen (DE); Jürgen Freudenberg, Hamburg (DE); Jochen Häfner, Blaufelden (DE)

(73) Assignee: EBM—Papst Mulfingen GmbH & Co. KG, Bachmühle (DE)

( * ) Notice: Subject to any disclaimer, the term of this patent is extended or adjusted under 35 U.S.C. 154(b) by 178 days.

(21) Appl. No.: 10/674,170

(22) Filed: Sep. 29, 2003

(65) Prior Publication Data

US 2004/0104628 A1    Jun. 3, 2004

(30) Foreign Application Priority Data

Sep. 30, 2002 (DE) ................................ 102 45 971

(51) Int. Cl.
*H02K 5/24* (2006.01)

(52) U.S. Cl. .................... 310/51; 310/67 R; 310/71; 310/89; 310/90

(58) Field of Classification Search ............... 310/51, 310/89, 67 R, 71, 90; 417/423.7, 423.14; 248/603, 638
See application file for complete search history.

(56) References Cited

U.S. PATENT DOCUMENTS

| 4,682,065 A | | 7/1987 | English et al. ................ 310/90 |
| 4,805,868 A | * | 2/1989 | Claude ....................... 248/603 |
| 5,245,236 A | | 9/1993 | Horng ....................... 310/67 R |
| 5,252,873 A | | 10/1993 | Hamamoto et al. ........... 310/90 |
| 5,533,704 A | * | 7/1996 | Fischinger et al. ......... 248/603 |
| 6,098,948 A | * | 8/2000 | Boucheret .................. 248/603 |
| 2004/0104628 A1 | * | 6/2004 | Streng et al. ................. 310/51 |

FOREIGN PATENT DOCUMENTS

| DE | 44 01 397 | * | 7/1995 |
| EP | 0 240 644 | | 10/1987 |
| EP | 0 521 791 | | 1/1993 |
| EP | 0 613 229 | | 8/1994 |
| EP | 0 666 424 | | 8/1995 |
| EP | 648 477 | * | 6/1998 |
| GB | 2 257 766 | * | 3/1993 |
| JP | 2001054253 | * | 2/2001 |
| WO | WO 00/57541 | | 9/2000 |

* cited by examiner

*Primary Examiner*—Karl Tamai
(74) *Attorney, Agent, or Firm*—Brinks Hofer Gilson & Lione (57) ABSTRACT

An electric motor, in particular an external rotor motor, comprising a stator which is attached by means of latching elements to a motor carrier using a plug-in joining operation. The elastic elements for isolating vibration are arranged in the connecting region between the stator and the motor carrier in a way that the stator is indirectly connected to the motor carrier by means of the elastic elements.

20 Claims, 7 Drawing Sheets

ELECTRIC MOTOR WITH SCREWLESS PLUG-TYPE MOUNTING

CROSS REFERENCE TO RELATED APPLICATION

This application claims priority to DE 102 45 971.1 filed Sep. 30, 2002, which is currently pending.

BACKGROUND OF THE INVENTION

Field of the Invention

The present invention relates to an electric motor, in particular an external rotor motor, having a stator which is attached to a motor carrier through a screwless fastening means of latching elements using an axial plug-in joining operation.

Such a motor is described comprehensively in WO 00/57541. For screwless mounting, the stator has axial latching arms which engage with end latching noses directly in the motor carrier or in corresponding openings in a pot-shaped housing part. Especially when the motor is used, as also described, for driving a fan wheel, in some cases extremely strong vibrations which can lead to disrupting noises occur during operation.

Although measures for vibration isolation are already known in the prior art (cf. for example EP 0 240 644 B1), these usually require screw-type connections.

SUMMARY OF THE INVENTION

The present invention is based on the object of achieving a significant reduction in the emission of operating noises with an electric motor of the type described at the beginning, while maintaining a simple and fast, screwless plug-type mounting, in particular between the stator and the motor carrier.

This is achieved in accordance with the invention in that elastic elements for isolating vibrations are arranged integrated into the connecting region between the stator and the motor carrier in such a way that the stator is connected to the motor carrier only indirectly by means of the elastic elements. This means that the latching elements which are provided for forming a holding connection no longer bring about any direct, vibration-transmitting connection. Instead, there is advantageously provision for the elastic elements to be each secured to a connecting section of the stator in such a way that the motor carrier can be plugged on axially with a corresponding connecting section. The latching elements are then used only for securing the elastic elements in relation to the motor carrier in the axial direction. For this purpose, the latching elements are embodied as separate spring clamps which can be latched onto the connecting section of the motor carrier from the outside in such a way that they hold the elastic elements in each case between an inner abutment step and an end spring-clamp supporting section which engages in the region of the elastic element.

Further advantageous refinement features of the invention are contained in the subclaims and the following description.

Additional benefits and advantages of the present invention will become apparent to those skilled in the art to which the present invention relates from the subsequent description of the preferred embodiment and the appended claims, taken in conjunction with the accompanying drawings.

The invention will be explained more precisely by way of example by reference to preferred embodiments which are illustrated in the drawing, in which:

In the various figures of the drawing, identical parts are always provided with the same reference symbols and therefore generally also need to be described only once in each case. Therefore, each description of a part which possibly appears only once with respect to a specific figure of the drawings applies also analogously to the other figures in the drawings in which this part is also shown with the corresponding reference symbol.

DETAILED DESCRIPTION OF THE INVENTION

Figure 7:
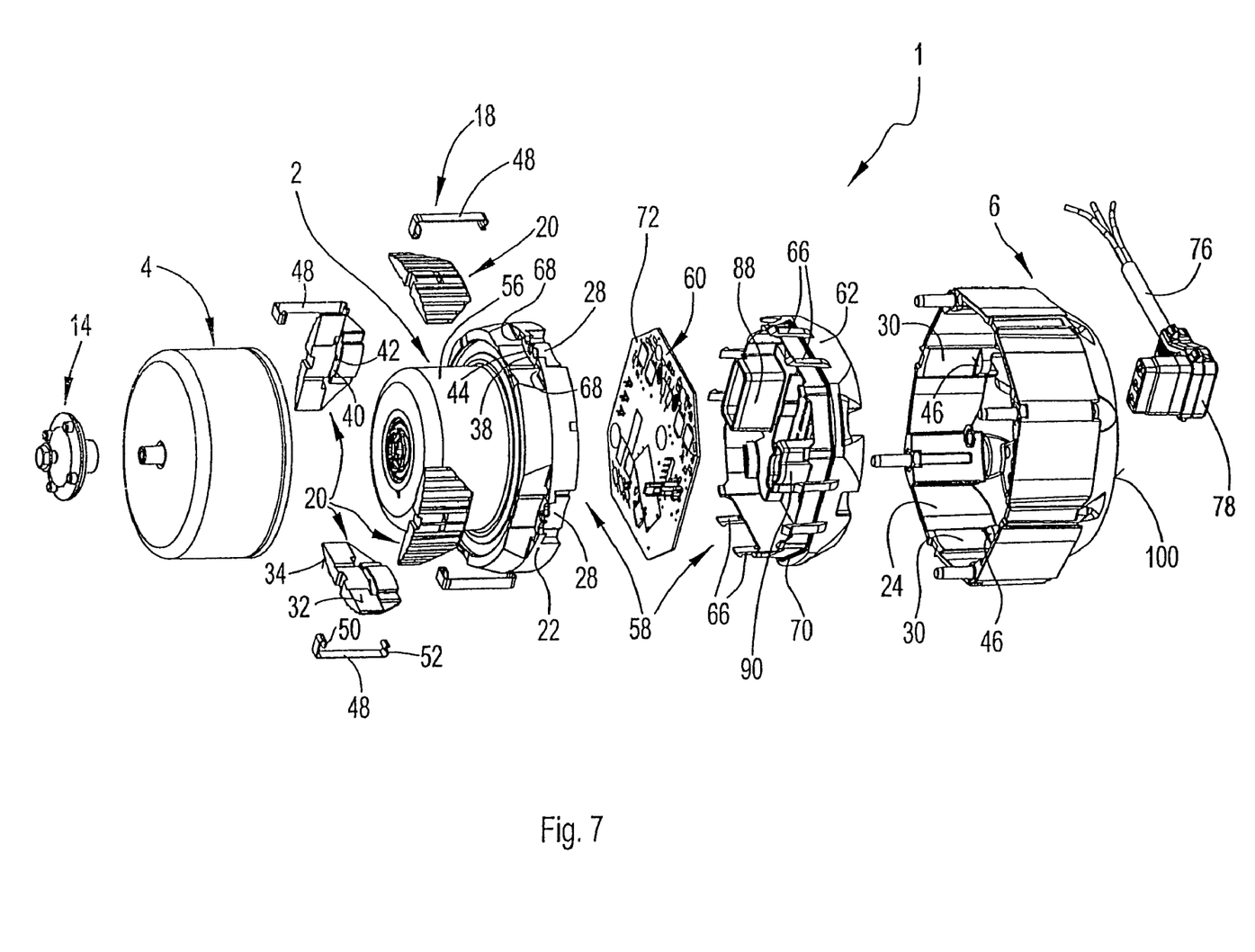
FIG. 7 shows a further exploded view (with rotor) which is divided up even further in terms of the individual parts.

An electric motor 1 according to the invention is formed in the illustrated embodiments as an external rotor motor. Here, the electric motor 1 is composed—see in this respect in particular the exploded views in FIGS. 7 and 9—of a stator 2, a rotor (external rotor) 4 and a motor carrier 6. The rotor 4 is mounted within the stator 2 by means of rotary bearings 8 so as to be capable of rotating about an axis 10 of the motor (see in this respect in particular the longitudinal sections in FIGS. 2, 5 and 8). In the embodiment according to FIGS. 1 to 7, a rotor shaft 12 extends axially out from the rotor 4 in the forward direction and an optional attachment element 14 for connecting a part or assembly (not illustrated) to be driven is arranged at its protruding end. In the case of the alternative embodiment according to FIGS. 8 and 9, the rotor shaft 12 ends in the region of an end wall of the rotor 4, the rotor 4 being fitted directly on its outer circumference with a fan wheel 16, for example.

The electric motor 1 and the stator 2 which is fitted with the rotor 4 is attached in a screwless fashion to the motor carrier 6 by means of latching elements 18 using an axial plug-in joining operation. Here, a plurality of elastic elements 20 for isolating vibrations are arranged integrated into the connecting region between the stator 2 and the motor carrier 6 in such a way that the stator 2 is connected to the motor carrier 6 only indirectly by means of elastic elements 20 while maintaining the screwless plug-type mounting. In the illustrated examples, four elastic elements 20 are provided in a radially symmetrical arrangement. However, some other number can also be provided in the region of three to six elements 20.

Figure 3:
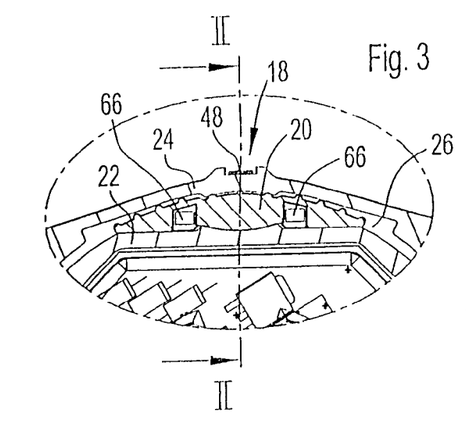
FIG. 3 shows an excerpt region in cross section in the plane III according to FIG. 2.
Figure 4:
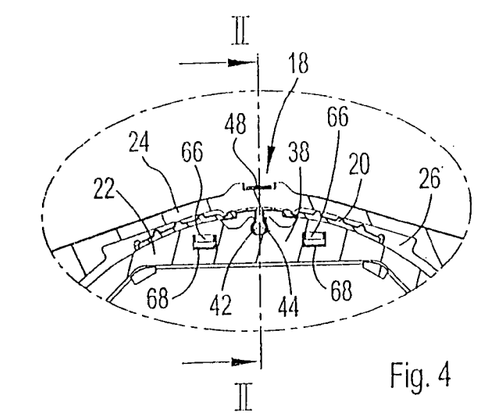
FIG. 4 shows a further cross section which is similar to FIG. 3, in the sectional plane IV according to FIG. 2.
Figure 6:
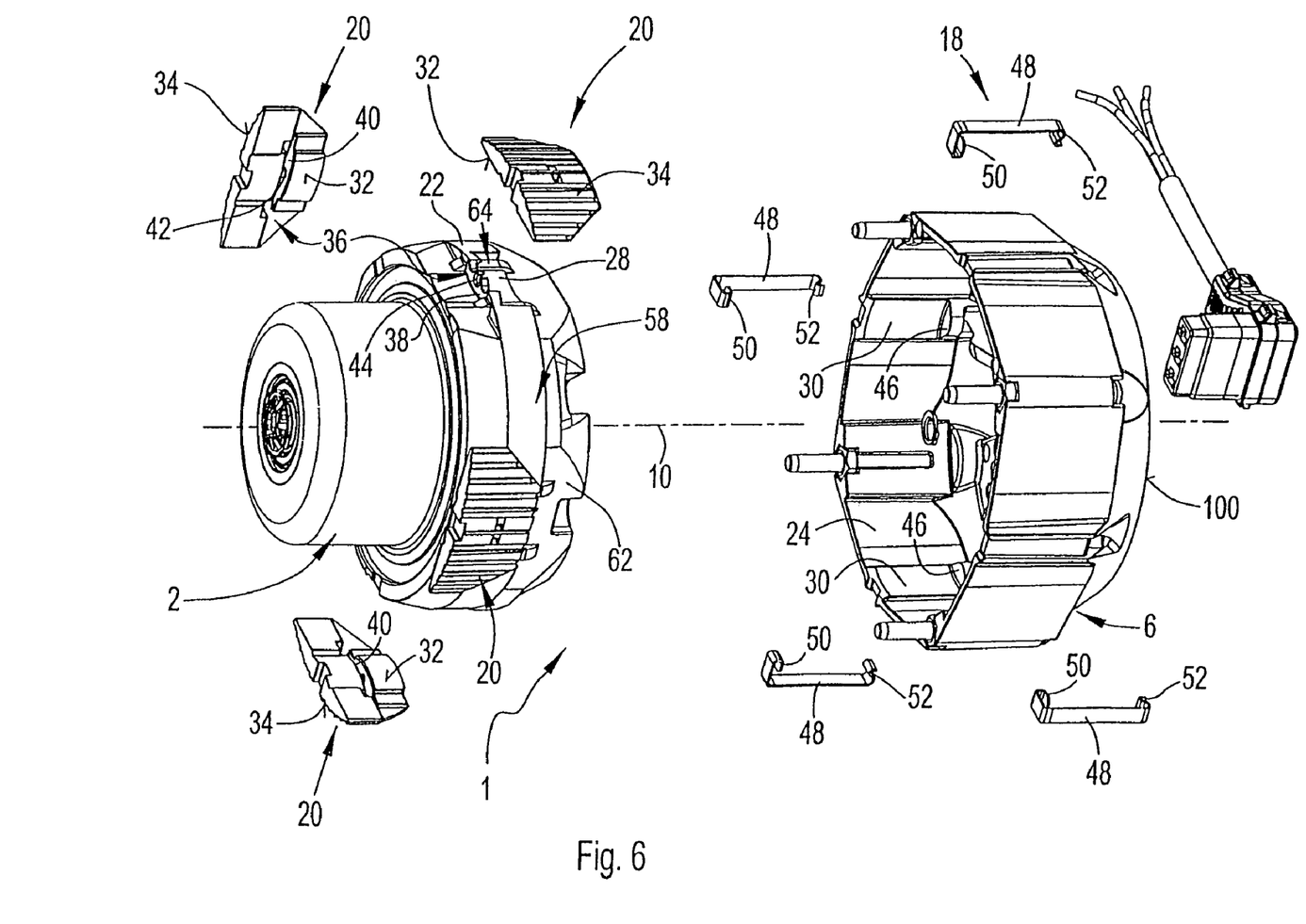
FIG. 6 shows a perspective exploded view of the motor according to FIGS. 1 to 5 (without rotor)

For this connection, the stator 2 and the motor carrier 6 each have connecting sections 22 and 24 which are coaxial with respect to the axis 10 of the motor, and thus with respect to one another, and plugged one over the other or one into the other with radial spacing. The elastic elements 20 are each seated with radial and axial prestress in a gap region 26 formed radially between the connecting sections 22, 24; see in this respect in particular the cross sections in FIGS. 3 and 4. Both connecting sections 22, 24 are preferably embodied as essentially annular web sections which extend axially, the connecting section 24 of the motor carrier 6 preferably engaging over the connecting section 22 of the stator 2 on the outside. Here, the elastic elements 20—see in particular FIG. 6—are embodied as individual, essentially planar shaped elements, each with slightly curved inner and outer surfaces 32, 34 which are shaped to match corresponding abutment regions 28 and 30 of the connecting sections 22, 24, in such a way that only slight elastic relative movements for isolating vibrations are possible in the axial direction, in the circumferential direction and also in the radial direction, between the connecting sections 22, 24 which are connected by means of the elastic elements 20.

Each elastic element 20 is held on the external circumference of the stator connecting section 22 using securing means 36 in such a way that a positively locking connection is provided in the axial direction, and at least one frictionally locking connection is provided in the radial and circumferential directions. As is apparent most clearly in FIG. 6, the securing means 36 are embodied as a tongue/groove connection which extends approximately in the circumferential direction and has an additional clippable frictionally locking connection (latching connection). For this purpose, each abutment region 28 of the stator-end connecting section 22 has a web 38 which runs in the circumferential direction (see in this respect also FIGS. 2 and 4), and each elastic element 20 has a corresponding receiving groove 40 for fitting it onto the web 38. Within the receiving groove 40, a knob-like shoulder 42 is arranged which engages in a latching fashion into a corresponding latching recess 44 of the web 38. This is very clear in particular in FIG. 4. As a result of the described configuration, each elastic element 20 can easily be seated radially on the abutment region 28 of the connecting section 22 and thus secured. The motor carrier 6 can then be pushed with its connecting section 24 over the elastic elements 20 in an axially frictionally locking fashion. Each elastic element 20 is then held in the pushed-on state in a positively locking fashion in the axial direction between an abutment step 46 within the motor-carrier connecting section 24 (see FIGS. 2, 5 and 8 as well as also FIG. 6) and a spring clamp 48 which is fitted on as a latching element 18. As a result, the entire motor is held in a vibration-isolated fashion by means of the stator 2 using only the elastic elements. This means that the electric motor 1 is suspended in a vibration-isolated fashion in the motor carrier 6 by means of the elastic elements 20. As is apparent in particular from the longitudinal sectional view in FIGS. 2, 5 and 8, each spring clamp 48 which is fitted on from the outside engages over the motor-carrier connecting section 24 on the outside in the axial direction and engages, with a supporting section 50 at one end, in the motor carrier connecting section 24 in the radial and axial directions in order to abut against the associated elastic element 20. Here, each spring clamp 48 is latched with a latching section 52 at the other end to the connecting section 24. As is illustrated, each latching section 52 is curved in an accurate shape and engages around a latching edge 54—with an approximately nose-like cross section—of the motor carrier 6.

In the illustrated preferred embodiments, the stator connecting section 22 is a component which is integrally formed onto a stator insulation means 56 composed in particular of a composite material sold under the trademark DUROPLAST. Here, the stator laminate core and stator windings (not illustrated) preferably have pressure applied around them while the connecting section 22 is simultaneously shaped.

According to one preferred refinement of the invention, the stator connecting section 22 additionally forms part of an inner electronics housing 58 for holding motor control electronics 60. This means that the connecting section 22 forms a wall of the electronics housing 58, an inner housing cap 62 additionally being advantageously connected to the connecting section 22 by means of latching elements 64 which can be joined axially. For this purpose, the housing cap 62 has axially protruding latching arms 66 which engage with latching projections in corresponding latching opening 68, in particular in the region of the webs 38 of the connecting section 22. Reference is made in this respect in particular to FIGS. 6 and 7. Two latching arms 66 or latching openings 68 are provided in the region of each web 38. Here, each elastic element 20 has corresponding cutouts—corresponding on the inside—for the latching arms 66, see in particular FIG. 3. Furthermore, a circumferential seal 70, which is composed of a soft elastic plastic and is molded, in particular integrally, onto the housing cap 62, is arranged between the housing cap and the connecting section 22. Here, the housing cap 62 can be economically manufactured in a two-component injection molding method.

The control electronics 60 are arranged at least partially on a printed circuit board 72, which is itself arranged within the electronics housing 58 on the side facing the stator 2 and is located in particular perpendicularly with respect to the axis 10 of the motor. All the necessary internal electrical connections, in particular between stator windings (not illustrated) and the control electronics 60 are through-connected via plug-type connections 74, such as illustrated for example in FIGS. 2 and 8, which can be joined axially. Furthermore, according to FIGS. 1 and 5, cf. also FIGS. 7 and 9, an external connecting cable 76 is connected, or can be connected, by means of a connecting plug 78 which can preferably be plugged in axially. For this purpose, according to FIG. 5, the printed circuit board 72 is fitted with a corresponding mating connector 80, the connecting plug 78 being guided in a sealed fashion through an opening in the respective motor carrier 6. Suitable soft seals are preferably provided for sealing purposes.

Figure 5:
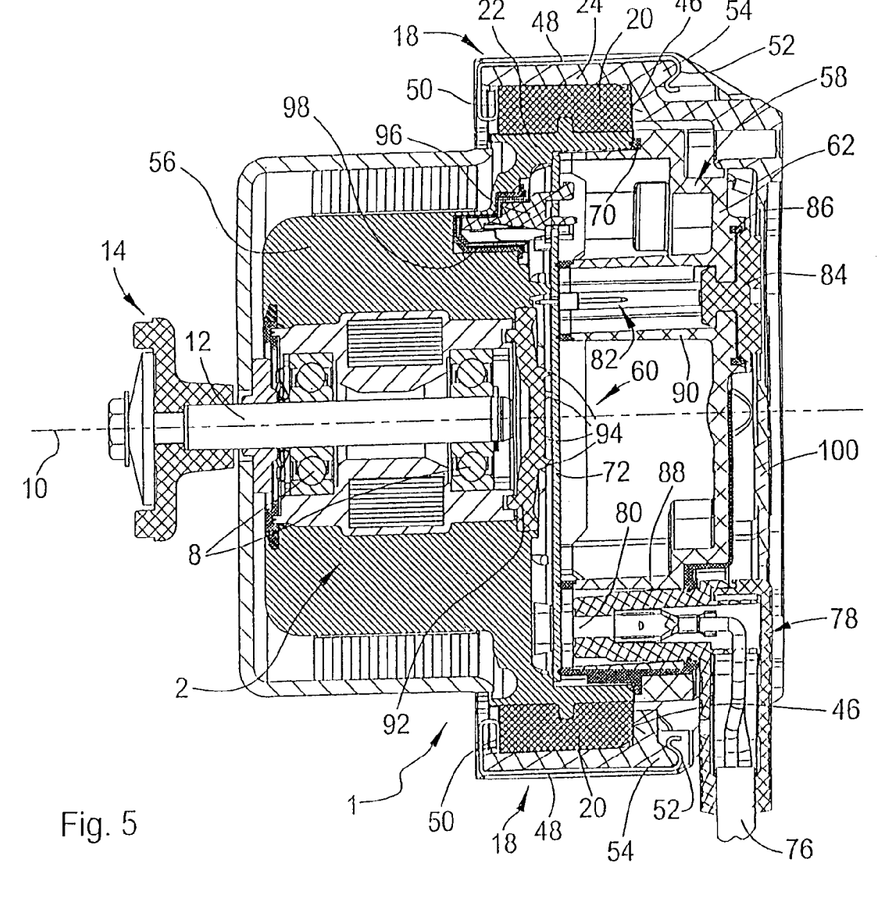
FIG. 5 shows a longitudinal section of the electric motor according to FIGS. 1 and 2 in a different diametric sectional plane corresponding to the diametrical V shown in FIG. 1.

As is also clear in FIG. 5, the control electronics 60 preferably have an interface 82 for connecting an external control line. This interface 82 is used in particular for programming the control electronics 60. The interface 82 is embodied as a plug-type connection which can be joined axially and is accessible through openings in the electronics housing 58, or the housing cap 62, and the respective motor carrier 6. These openings, in particular the opening in the housing cap 62, are closed off by a detachable closure element 84. This may advantageously be what is referred to as a toggle closure or bayonet closure which is sealed by means of a seal 86.

Here, the housing cap 62 has plug housings (plugging shafts) 88, 90 which are integrated, i.e. molded on integrally, for receiving the connecting plug 78 in a guiding fashion, or for receiving a plug (not illustrated) for the interface 82 on (FIG. 5).

Figure 1:
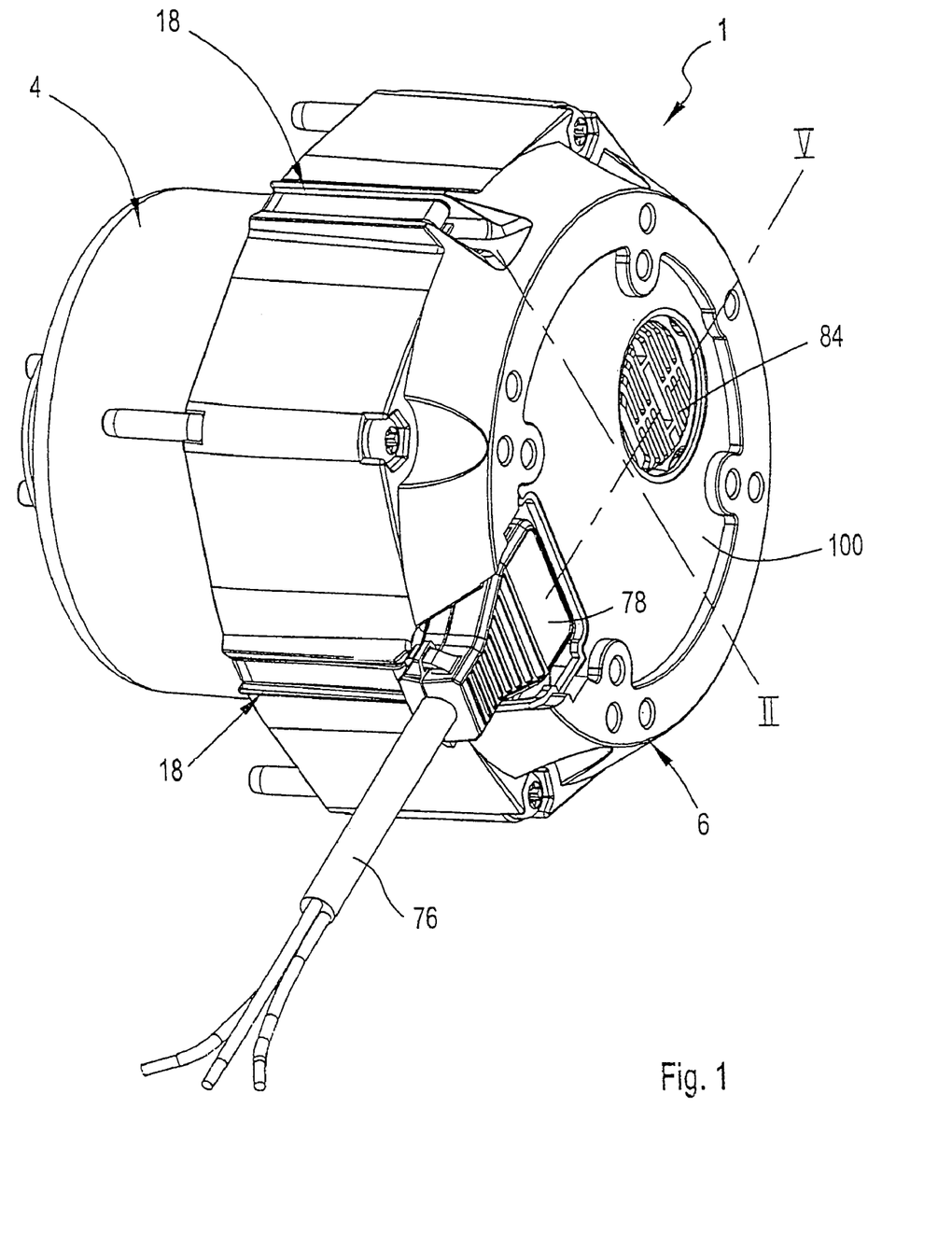
FIG. 1 shows a perspective view of an electric motor according to the invention with a first embodiment of a motor carrier.
Figure 2:
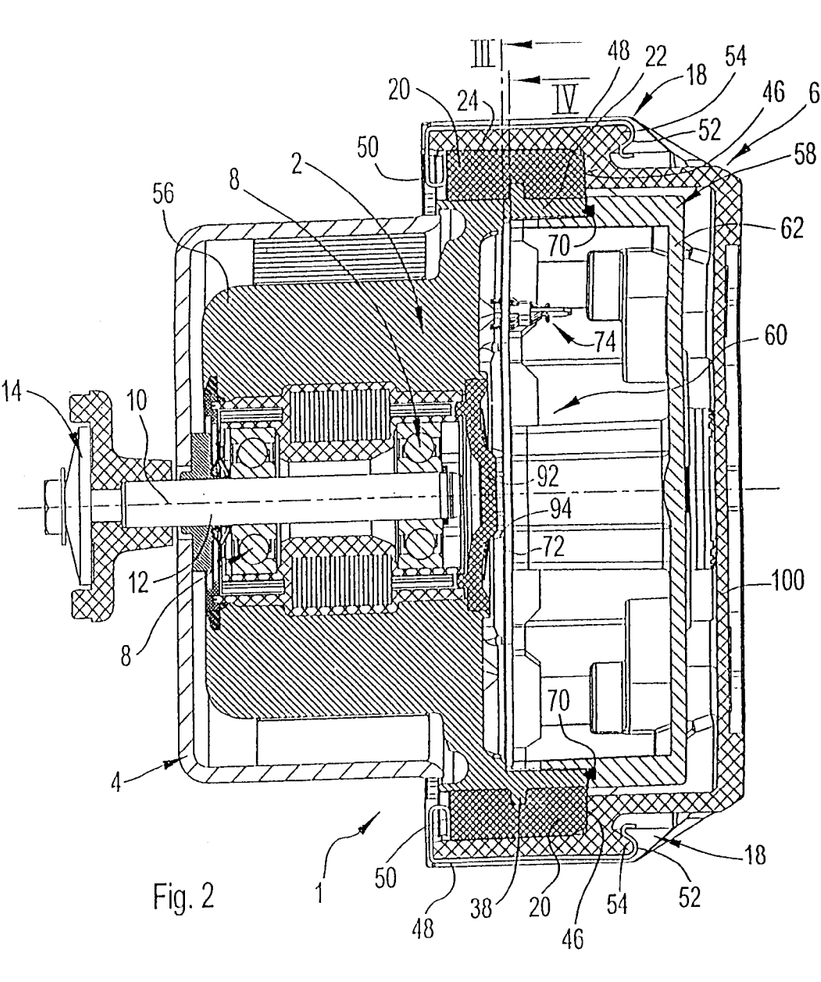
FIG. 2 shows an axial section through the motor according to FIG. 1 in a first diametric sectional plane (plane II—II according to FIGS. 3 and 4, or corresponding to the diagonal II shown in FIG. 1)
Figure 8:
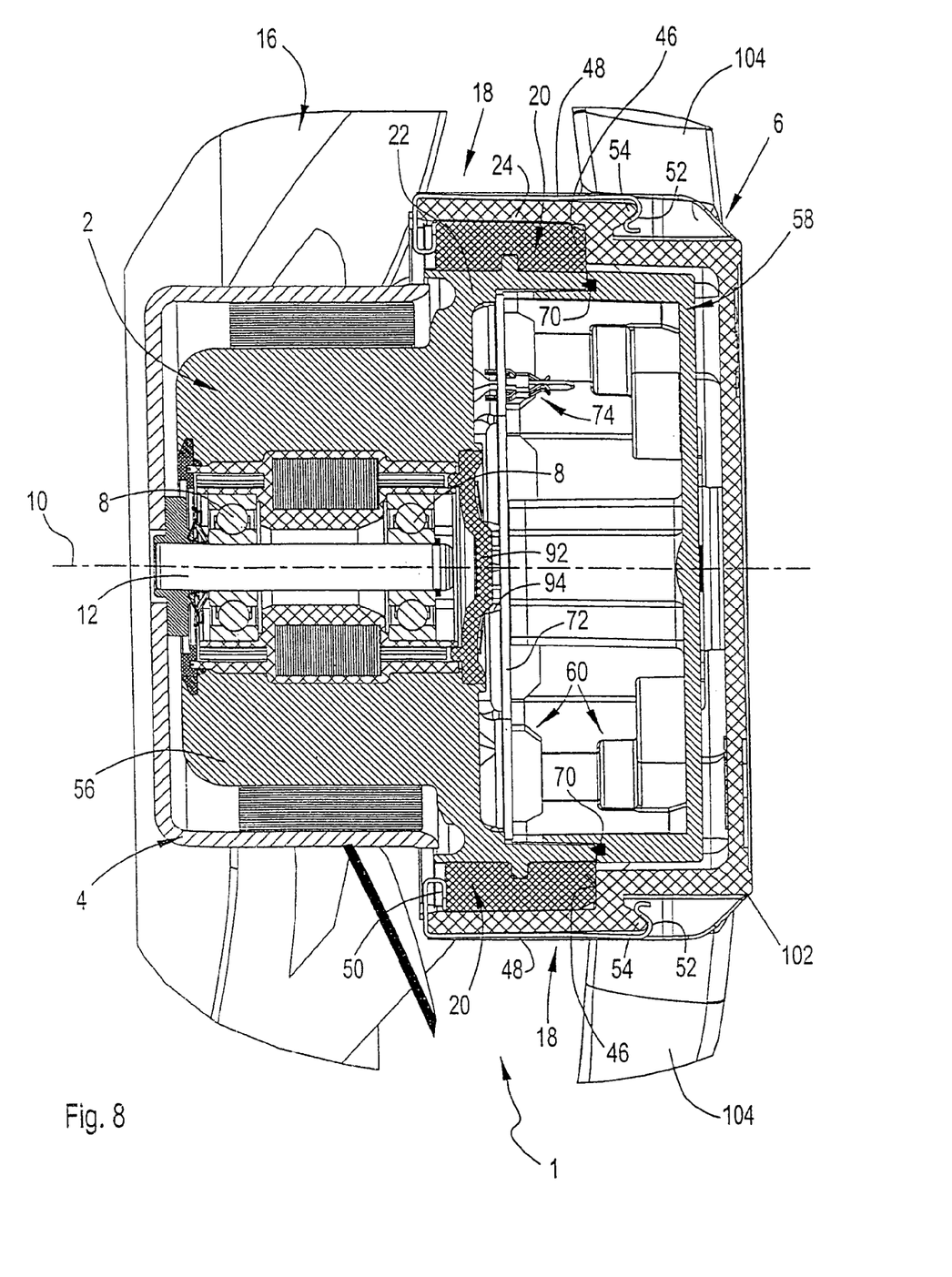
FIG. 8 shows a longitudinal section, analogous to FIG. 2, in an embodiment variant (inter alia with a different motor carrier)

As is also apparent in particular from the longitudinal sections in FIGS. 2, 5 and 8, the stator 2 has a mounting opening for mounting one of the rotational bearings 8 of the rotor on the side facing the printed circuit board 72, said mounting opening being closed off with a closure part 92 in order to disconnect the bearing region from the electronics housing 58. This closure part 92 is composed of an elastic material (sealing material) and has preferably molded-on projections 94 to permit it to abut against the printed circuit board 72 in a way which provides support and avoids vibration.

In addition, FIG. 5 illustrates a sensor 96, in particular a rotor position sensor, of the control electronics 60, where sensor 96 projects axially from the printed circuit board 72 into a recess in the stator 2 and is surrounded by an electrically insulating, cup-like insulating means 98. This insulating means 98 may be at least one so-called film cup, if appropriate even a plurality, for example two film cups which are fitted one into the other.

In the embodiment according to FIGS. 1 to 7, the motor carrier 6 is embodied as a pot-like holding flange with a bottom wall 100 and the connecting section 22 which is connected thereto in particular integrally. In this embodiment, the motor carrier 6 is composed in particular of metal, for example aluminum.

Figure 9:
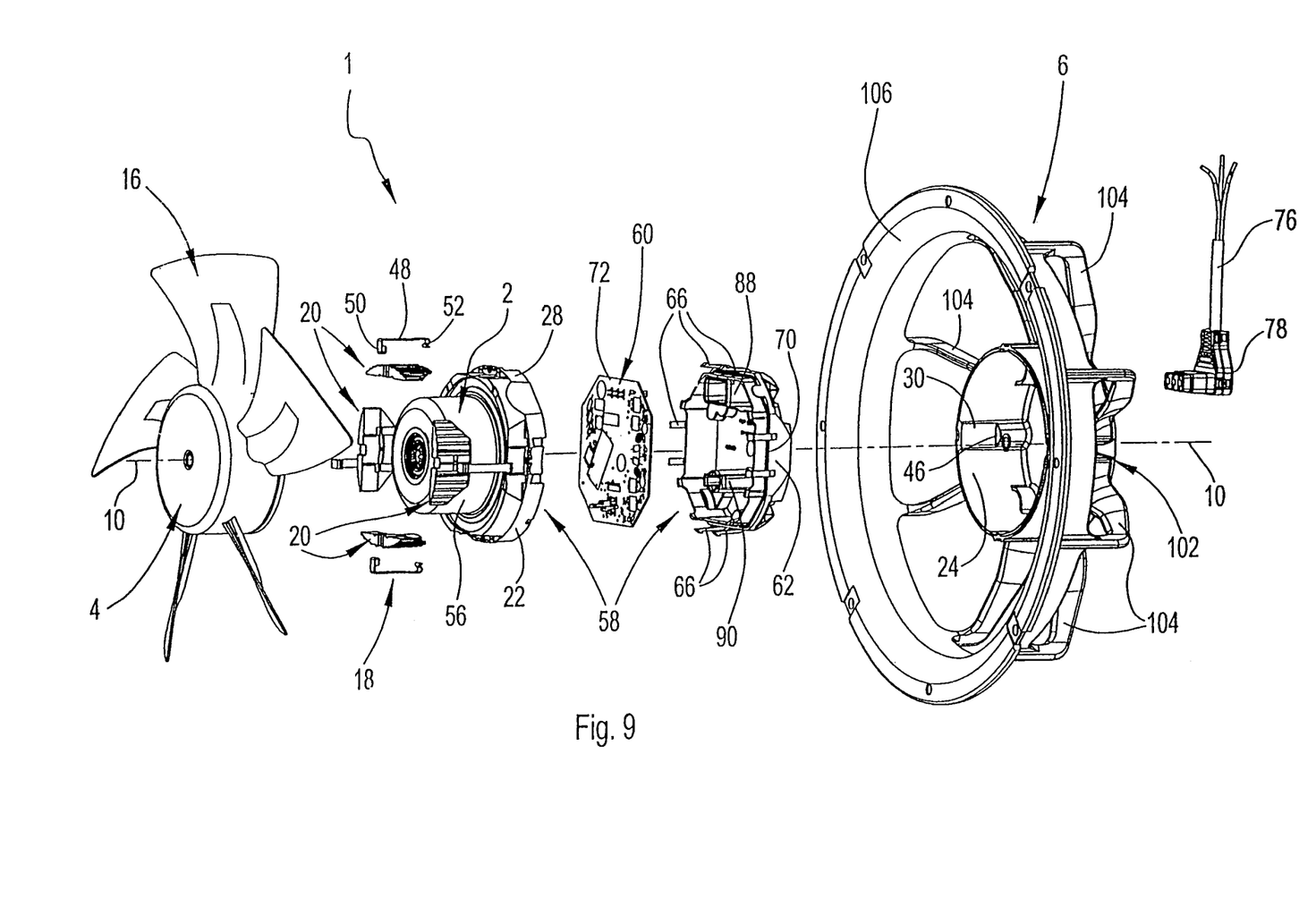
FIG. 9 shows a perspective exploded view of the embodiment according to FIG. 8, analogous to FIG. 7.

In contrast to this, in the case of the embodiment in FIGS. 8 and 9, the motor carrier 6 is embodied as a so-called wall ring with an in particular pot-like inner part 102, which has the connecting section 24 and is, and an outer ring 106 which is connected thereto by means of approximately radial spoke elements 104. This wall ring is formed in particular from plastic as a single-piece molded part.

The described and preferred refinement of the electric motor 1 according to the invention achieves, in practical terms, a modular design which is optimized in terms of fabrication. The components of the motor 1 can be mounted easily and quickly in a screwless fashion using only axial joining operations. A high degree of IP protection is also achieved. The connecting plug 78 permits subsequent connection of the connecting lines 76 only after the motor has been completely mounted. The motor operates with very low noise. As a result of the modular design, different housing geometries can easily be implemented. The electronics housing 58 makes a costly electronics casting superfluous. Furthermore, a programming possibility is easily provided.

The invention is not restricted to the exemplary embodiments which are illustrated and described but rather also includes all embodiments which have the same effect in the sense of the invention. Thus, "reversed" mutual engagement of the connecting sections 22, 24 of the stator 2 and of the motor carrier 6 is also possible, i.e. the stator could also engage with its connecting section over the connecting section of the motor carrier. Furthermore, it is also basically possible to provide a casting of the motor electronics (instead of the clipped-on housing). Moreover, the invention is in any case not restricted to the features contained in claim 1 but rather can also be defined by any desired other combination of specific features of all the individual features which are disclosed in total. This means that basically virtually any individual feature of claim 1 can be omitted or can be replaced by at least one individual feature which is disclosed elsewhere in the application. In this respect, claim 1 is to be seen merely as a first formulation attempt for an invention.

As a person skilled in the art will readily appreciate, the above description is meant as an illustration of implementation of the principles of this invention. This description is not intended to limit the scope or application of this invention in that the invention is susceptible to modification, variation and change, without departing from the spirit of this invention, as defined in the following claims.

We claim:

1. An electric motor, comprising:
a stator having a stator connecting section; and
a motor carrier having a motor carrier connecting section;
the stator connecting section being attached to the motor carrier connecting section using a plug-in joining connection, wherein elastic elements for isolating vibration are arranged in a connecting region between the stator and the motor carrier, whereby the stator is connected to the motor carrier only indirectly by means of the elastic elements; and
spring clamps having a latching section, the spring clamps engaging over the motor carrier connecting section in the radial and axial directions relative to the stator axis of rotation in order to abut against the associated elastic element and latched with the latching section at an end of the motor carrier connecting section.

2. The electric motor as claimed in claim 1, wherein the stator connecting section and the motor carrier connecting section are coaxial relative to the stator axis of rotation, the stator connecting section plugged into motor carrier connecting section, the elastic elements disposed in a gap region formed between the motor carrier and stator connecting sections, and distributed in a radially symmetrical fashion.

3. The electric motor as claimed in claim 2, wherein the elastic elements individually comprise substantialy planar shaped elements, each with inner and outer surfaces which are shaped to match corresponding abutment regions of the motor carrier connecting section and the stator connecting section.

4. The electric motor as claimed in one of claim 2, wherein the stator connecting section is a component integrally formed onto a stator insulation means composed of a composite material sold under the trademark DUROPLAST.

5. The electric motor as claimed in claim 2, wherein the motor carrier further comprises a holding flange with a bottom wall integrally connected to the stator connecting section.

6. The electric motor as claimed in claim 2, wherein the motor carrier further comprises a wall ring with a pot-like inner part, which has the motor carrier connecting section is connected to an outer ring by means of spoke elements.

7. The electric motor as claimed in claim 2, wherein the stator connecting section and the motor carrier connecting section comprise substantially annular web sections which extend axially, the rotor carrier connecting section of the motor carrier engaging over the stator connecting section of the stator.

8. The electric motor as claimed in claim 7, wherein each elastic element is held on the external circumference of the stator connecting section using a securing means configured to create a positively locking connection in the axial direction, and at least one frictionally locking connection in the radial direction.

9. The electric motor as claimed in claim 8, wherein the securing means comprises a tongue/groove connection extending in the radial direction and having a clippable frictionally locking connection.

10. The electric motor as claimed in claim 7 wherein the motor carrier connecting section engages the elastic elements in a frictionally locking fashion, each elastic element being held in a positively locking fashion in the axial direction between an abutment step within the motor carrier connecting section and the spring clamp.

11. The electric motor as claimed in claim 1, wherein an external connecting cable is connected by means of a connecting plug which can be plugged in axially.

12. An electric motor, comprising a stator which is attached by means of latching elements to a motor carrier using a joining connection, wherein elastic elements for isolating vibration are arranged in a connecting region between the stator and the motor carrier, whereby the stator is connected to the motor carrier only indirectly by means of the elastic elements;
wherein the stator connecting section and the motor carrier connecting section are coaxial relative to the stator axis of rotation, the stator connecting section plugged into motor carrier connecting section, the elastic elements disposed in a gap region formed between the motor carrier and stator connecting sections, and distributed in a radially symmetrical fashion;
wherein the stator connecting section and the motor carrier connecting section comprise substantially annular web sections which extend axially, the motor carrier connecting section engaging over the stator connecting section;
wherein the motor carrier connecting section enages the elastic elements in a frictionally locking fashion, each elastic element being held in a positively locking fashion in the axial direction between an abutment step within the motor carrier connecting section and a spring clamp;
wherein the spring clamp engages over the motor carrier connecting section in the axial direction relative to the stator axis of rotation and engages, with a supporting section a first end, in the motor carrier connecting section in the radial and axial directions relative to the stator axis of rotation in order to abut against the associated elastic element, and latch with a latching section at a second end of the motor carrier connecting section.

13. An electric motor, comprising a stator which is attached by means of latching elements to a motor carrier using a joining connection, wherein elastic elements for isolating vibration are arranged in a connecting region between the stator and the motor carrier, whereby the stator is connected to the motor carrier only indirectly by means of the elastic elements;
wherein the stator connecting section and the motor carrier connecting section are coaxial relative to the stator axis of rotation, the stator connecting section plugged into the motor carrier connecting section forming a gap region between the motor carrier connecting section and the stator connecting section, the elastic elements disposed in the gap region and distributed in a radially symmetrical fashion;
wherein the stator connecting section additionally forms part of an inner electronics housing for holding motor control electronics, an inner housing cap being connected to the stator connecting section by means of latching elements which can be connected axially.

14. The electric motor as claimed in claim 13, further comprising a circumferential seal, the circumferential seal being composed of a soft elastic plastic and is molded in particular onto the housing cap and arranged between the housing cap and the stator connecting section.

15. The electric motor as claimed in claim 13, wherein a printed circuit board is arranged within the inner electronics housing and is located perpendicularly relative to the stator axis of rotation.

16. The electric motor as claimed in claim 13, wherein internal electrical connections between the stator windings and the motor control electronics are made via plug-type connections which can be joined axially.

17. The electric motor as claimed in claim 13, wherein the motor control electronics further comprise an interface for connecting an external control line, the interface having a plug-type connection which can be joined axially and is accessible through an opening in the inner electronics housing, the opening being closed off by a detachable closure element.

18. The electric motor as claimed in claim 13, wherein a mounting opening is formed within the stator between the inner electronics housing and a rotor bearing, the mounting opening having a closure part for closing the mounting opening.

19. The electric motor as claimed in claim 18, wherein the closure part is composed of an elastic material and abuts the printed circuit board by means of molded-on projections in order to provide support against vibrations of the printed circuit board.

20. The electric motor as claimed in claim 13, wherein the motor control electronics further comprise a rotor position sensor, which projects into the stator and is surrounded by an electrically insulating, cup-like insulating means.

* * * * *

UNITED STATES PATENT AND TRADEMARK OFFICE
CERTIFICATE OF CORRECTION

PATENT NO. : 6,987,336 B2  Page 1 of 1
APPLICATION NO. : 10/674170
DATED : January 17, 2006
INVENTOR(S) : Gunter Streng et al.

It is certified that error appears in the above-identified patent and that said Letters Patent is hereby corrected as shown below:

In claim 7, line 4, change "rotor" to --motor--.

In claim 10, line 1, after "7" insert --,--.

Signed and Sealed this

Twelfth Day of December, 2006

JON W. DUDAS
*Director of the United States Patent and Trademark Office*